United States Patent
Kuo

(10) Patent No.: US 9,648,219 B2
(45) Date of Patent: May 9, 2017

(54) WEB CAMERA AND OPERATION METHOD THEREOF

(71) Applicant: ASUSTeK COMPUTER INC., Taipei (TW)

(72) Inventor: Chun-Liang Kuo, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 12 days.

(21) Appl. No.: 14/941,650

(22) Filed: Nov. 15, 2015

(65) Prior Publication Data

US 2016/0142614 A1    May 19, 2016

(30) Foreign Application Priority Data

Nov. 17, 2014  (TW) .............................. 103139762 A

(51) Int. Cl.
*H04N 5/232*    (2006.01)

(52) U.S. Cl.
CPC ................. *H04N 5/23206* (2013.01)

(58) Field of Classification Search
CPC ........... H04N 5/23261; H04N 5/23241; H04N 5/23206; H04N 1/0037; H04N 1/0344; H04N 1/00891; H04N 2201/007; H04N 2201/74; H04W 84/12
See application file for complete search history.

(56) References Cited

U.S. PATENT DOCUMENTS

| | | | |
|---|---|---|---|
| 7,764,190 B2 | 7/2010 | Mortensen | |
| 2013/0217427 A1* | 8/2013 | Bajko | H04W 48/14 455/507 |
| 2014/0169795 A1* | 6/2014 | Clough | G06F 19/3418 398/106 |
| 2014/0300775 A1* | 10/2014 | Fan | H04N 5/23229 348/231.3 |

FOREIGN PATENT DOCUMENTS

| | | |
|---|---|---|
| CN | 102332205 | 1/2012 |
| CN | 203104501 | 7/2013 |
| TW | M469697 | 1/2014 |

* cited by examiner

*Primary Examiner* — Tuan Ho
(74) *Attorney, Agent, or Firm* — Jianq Chyun IP Office

(57) ABSTRACT

A web camera and an operation method thereof are provided. The web camera includes a photographic unit, an infrared (IR) transmitter, a network communication unit and a processing unit. The photographic unit captures an image. The network communication unit establishes a connection with a remote host via a communication network. The processing unit sends the image captured by the photographic unit to the remote host via the network communication unit. The processing unit receives a control command from the remote host via the network communication unit. The processing unit transmits an IR control code corresponding to the control command to a target device via the IR transmitter. The processing unit determines whether the target device responds to the IR control code based on the image.

10 Claims, 5 Drawing Sheets

WEB CAMERA AND OPERATION METHOD THEREOF

CROSS-REFERENCE TO RELATED APPLICATION

This application claims the priority benefit of Taiwan application serial No. 103139762, filed on Nov. 17, 2014. The entirety of the above-mentioned patent application is hereby incorporated by reference herein and made a part of specification.

BACKGROUND OF THE INVENTION

Field of the Invention

The invention relates to a camera device, and more particularly, to a web camera and an operation method thereof.

Description of the Related Art

Conventionally, the home appliance includes an infrared (IR) control function, and a user can control it via an IR controller. However, the IR control is a one-way control. That means, after the IR controller sends out a control signal, the home appliance would not send an acknowledge signal back to the IR controller, and the user has to check whether the home appliance responds accordingly or not. Moreover, in some cases, users cannot check the home appliance while controlling when it is beyond users' eyesight.

BRIEF SUMMARY OF THE INVENTION

According to a first aspect of the present disclosure, a web camera, comprises: a photographic unit capturing a plurality of images; an infrared (IR) transmitter; a network communication unit connected to a remote host via a communication network; and a processing unit coupled to the photographic unit, the IR transmitter and the network communication unit; wherein the processing unit sends the image to the remote host via the network communication unit, receives a control command from the remote host, transmits an IR control code corresponding to the control command to a target device via the IR transmitter, and determines whether the target device responds to the IR control code according to the images including the target device, if the target device responds to the IR control code, the processing unit determines that the IR control code is matched with the target device.

Furthermore, according to a second aspect of the present disclosure, an operation method of a web camera, comprises following steps: capturing a plurality of images by a photographic unit; sending the plurality of images to a remote host via a communication network; receiving a control command from the remote host; transmitting an infrared (IR) control code corresponding to the control command to a target device via an IR transmitter; and determining whether the target device responds to the IR control code according to the images including the target device by a processing unit, if the target device responds to the IR control code, determining that the IR control code is matched with the target device.

These and other features, aspects and advantages of the present disclosure will become better understood with regard to the following description, appended claims, and accompanying drawings.

DETAILED DESCRIPTION OF THE EMBODIMENTS

The word "couple" in the specification and the claim refers to any direct or indirect connecting way. For example, a first device is described as being coupled to a second device, it means that the first device is directly connected to the second device, or the first device is indirectly connected to the second device via other devices or connecting ways. Moreover, the same symbols in the figures and the embodiments denote the same or similar elements, components or steps. Relative descriptions of the elements, components or steps using the same symbols in different embodiments can be cross referenced.

Figure 1:
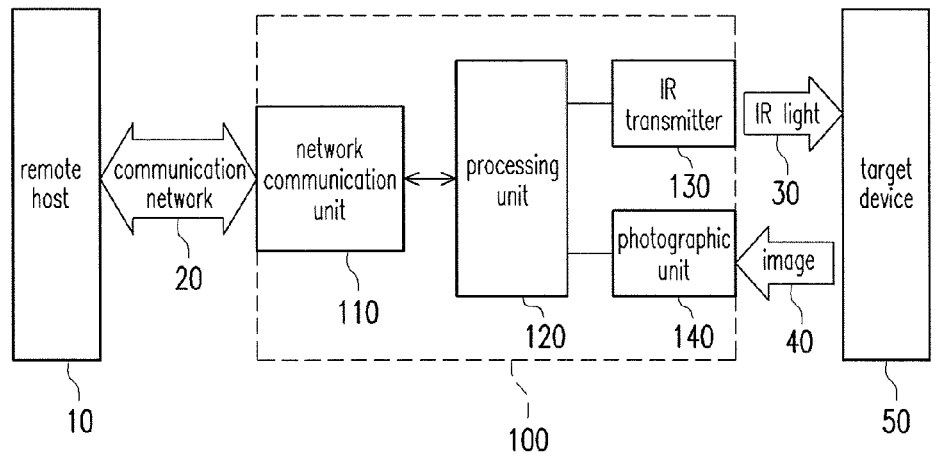
FIG. 1 is a block diagram showing a web camera in an embodiment.

FIG. 1 is a block diagram showing a web camera 100 in an embodiment. The remote host 10 in FIG. 1 may be a smart phone, a tablet computer or a personal computer. The remote host 10 establishes a connection with the web camera 100 via the communication network 20. The remote host 10 can obtain local images 40 via the connected web camera 100. The web camera 100 also includes an IR control function. The remote host 10 can remotely control the web camera 100 to transmit an IR control code 30 to the target device 50. The IR control is one-way control. The web camera 100 transmits the IR control code 30 corresponding to the control command from the remote host 10 to the target device 50, and the web camera 100 captures images 40 including the target device 50 at the same time. The web camera 100 can determine whether the target device 50 responds to the IR control code 30 according to the image 40 including the target device 50, and if yes, the IR control code is matched with the target device. Furthermore, the web camera 100 selectively sends back the determining result to the remote host 10. Thus, the remote host 10 can remotely control and confirm the state of the local target device 50 via the web camera 100.

As shown in FIG. 1, the web camera 100 includes a network communication unit 110, a processing unit 120, an IR transmitter 130 and a photographic unit 140. The photographic unit 140 captures the images 40. The network communication unit 110 establishes a connection with the remote host 10 via the communication network 20. The processing unit 120 is coupled to the network communication unit 110, the IR transmitter 130 and the photographic unit 140.

Figure 2:
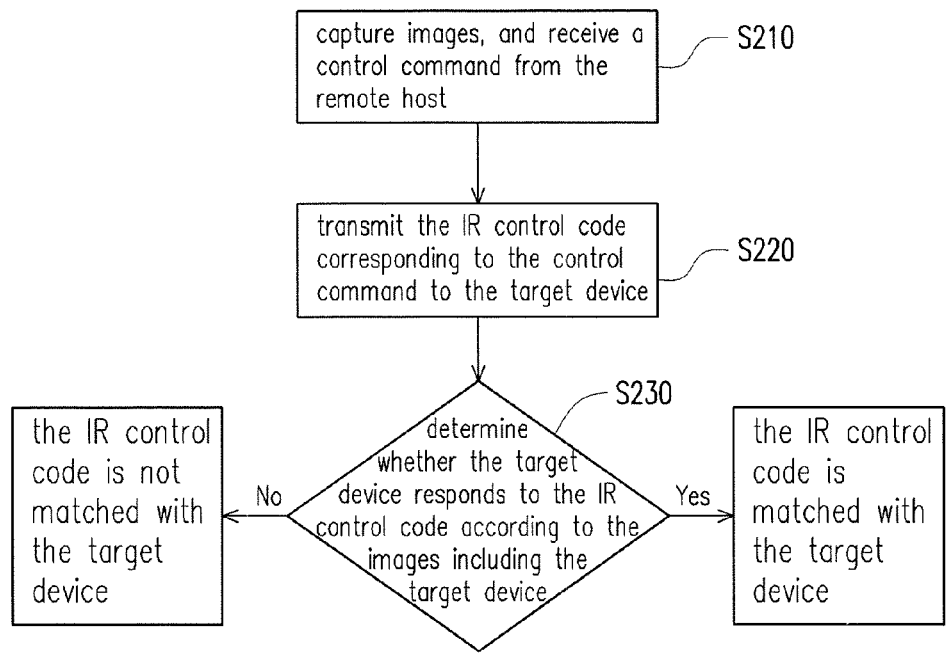
FIG. 2 is a flow chart showing an operation method of a web camera in an embodiment.

FIG. 2 is a flow chart showing an operation method of the web camera in an embodiment. Please refer to FIG. 1 and FIG. 2, Step S210 is to capture images 40, send the images 40 to the remote host 10, and receive a control command. In an embodiment, the photographic unit 140 captures the images 40, and the processing unit 120 sends the images 40 to the remote host 10 via the network communication unit 110 and the communication network 20. When the photographic unit 140 captures the images 40, the processing unit 120 controls the IR transmitter 130 to provide invisible light as auxiliary light for the photographic unit 140. In the step S210, the processing unit 120 also receives a control command from the remote host 10 via the communication network 20 and the network communication unit 110.

Step S220 is to transmit the IR control code 30 corresponding to the control command to the target device 50. In an embodiment, the processing unit 120 transmits the IR control code 30 corresponding to the control command to the target device 50 via the IR transmitter 130 and captures the image 40. Step S230 is to determine whether the target device 50 responds to the IR control code 30 according to the images 40 including the target device 50. In an embodiment, the processing unit 120 determines whether the target device 50 responds to the IR control code 30 according to the image 40 including the target device 50. If yes, the processing unit 120 determines the IR control code is matched with the target device. If no, the processing unit 120 determines the IR control code is not matched with the target device. The processing unit 120 can determine whether the local television (the target device 50) responds to the IR control code 30 according to the image 40. In an embodiment, the processing unit 120 determines whether the target device 50 responds to the IR control code 30 in step S230 via a motion detection on the image 40.

In an embodiment, the remote host 10 sends the IR control code 30 via the web camera 100 to turn on the local television (the target device 50). The processing unit 120 captures an image 40 of the local television (the target device 50) via the photographic unit 140. The processing unit 120 compares the images 40 that captured before and after the IR control code 30 is sent to see whether the target device 50 responses or not. When the screen shows that the local television (the target device 50) in the images 40 change from an on-state (displaying images) to an off-state (displaying no image), the local television (the target device 50) is determined that it is responsive to the IR control code 30. Otherwise, the processing unit 120 determines that the remote control is failure when no change between the images 40 that captured before and after the IR control code 30 is sent.

In another embodiment, the remote host 10 can send the IR control code 30 to turn on the local air conditioner (the target device 50) via the web camera 100. The processing unit 120 captures the images 40 of the local air conditioner (the target device 50) via the photographic unit 140. The processing unit 120 compares the image 40 captured before the IR control code 30 is sent and the image 40 captured after the IR control code 30 is sent. Since the air outlet of the local air conditioner (the target device 50) in the images 40 change from shutting down to opening, the processing unit 120 can determine whether the local air conditioner (the target device 50) responds to the IR control code 30 according to the images 40 by using any image processing technology.

In the step S230, in another embodiment, the processing unit 120 may also send back the determining result of whether the target device 50 responds to the IR control code 30 to the remote host 10 via the network communication unit 110 and the communication network 20. Thus, the remote host 10 can remotely control and confirm the state of the local target device 50 via the web camera 100.

Figure 3:
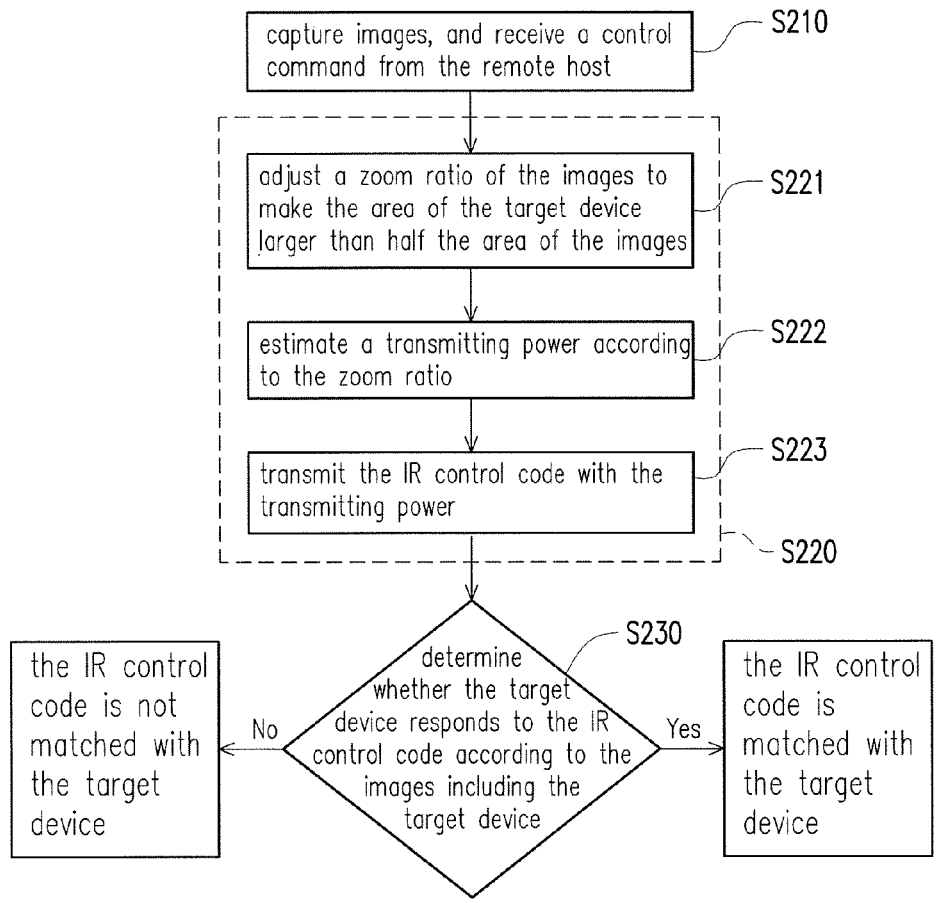
FIG. 3 is a flow chart showing an operation method of a web camera in an embodiment.

FIG. 3 is a flow chart showing an operation method of the web camera in an embodiment. The steps S210, S220 and S230 shown in FIG. 3 can be referred to those shown in FIG. 2. In the embodiment shown in FIG. 3, the step S220 further includes sub steps S221, S222 and S223.

Please refer to FIG. 1 and FIG. 3, Step S221 is to capture the image 40 and recognize a size of the target device 50 shown in the images 40. In an embodiment, the processing unit 120 captures the images 40 and recognizes a size of the target device 50 shown in the image 40. The processing unit 120 can adjust a zoom ratio of the images 40 in the step S221, so as to make the area of the target device 50 shown in the image 40 larger than half the area of the images 40. In an embodiment, the photographic unit 140 includes a zoom function. Thus, in the step S221, the processing unit 120 can control or adjust the focus of the photographic unit 140 to adjust the size of the target device 50 in the images 40. In other embodiments, the processing unit 120 can change the size of the target device 50 in the images 40 via image interpolation, partial image capturing or other image processing technologies in the step S221.

Step S222 is to estimate a transmitting power according to the zoom ratio in the step S221. In an embodiment, the processing unit 120 estimates a transmitting power according to the zoom ratio in the step S221. Step S223 is to dynamically control or adjust the power of the IR transmitter 130 and transmit the IR control code 30 to the target device 50 with the power estimated in the step S222. In an embodiment, the processing unit 120 can dynamically control or adjust the power of the IR transmitter 130, and the IR transmitter 130 transmits the IR control code 30 to the target device 50 with the power estimated in the step S222. In the embodiment, since the power of the IR transmitter 130 can be dynamically adjusted according the distance between the web camera 100 and the target device 50, the power consumption can be reduced.

Figure 4:
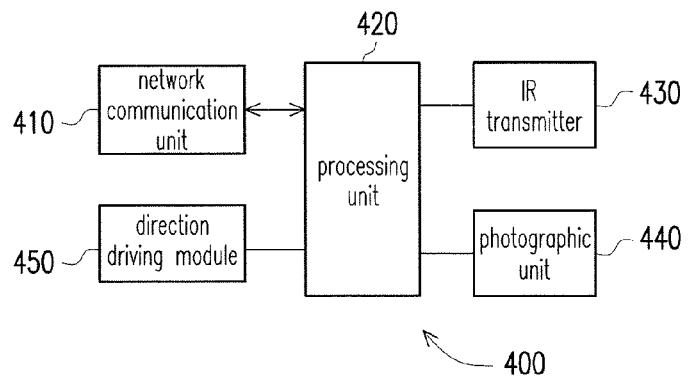
FIG. 4 is a block diagram showing a web camera in an embodiment.

The web camera is not limited to the previous embodiments. FIG. 4 is a block diagram showing a web camera 400 in an embodiment. The web camera 400, the network communication unit 410, the processing unit 420, the IR transmitter 430 and the photographic unit 440 shown in FIG. 4 can be referred to those shown in FIG. 1. In the embodiment shown in FIG. 4, the web camera 400 further includes a direction driving module 450 coupled to the processing unit 420. The direction driving module 450 can adjust a capturing direction of the photographic unit 440 according to the control of the processing unit 420. In embodiments, the direction driving module 450 can control or change a panning direction or a tilt direction of the photographic unit 440 via a motor, a gear, a screw or other mechanisms.

Figure 5:
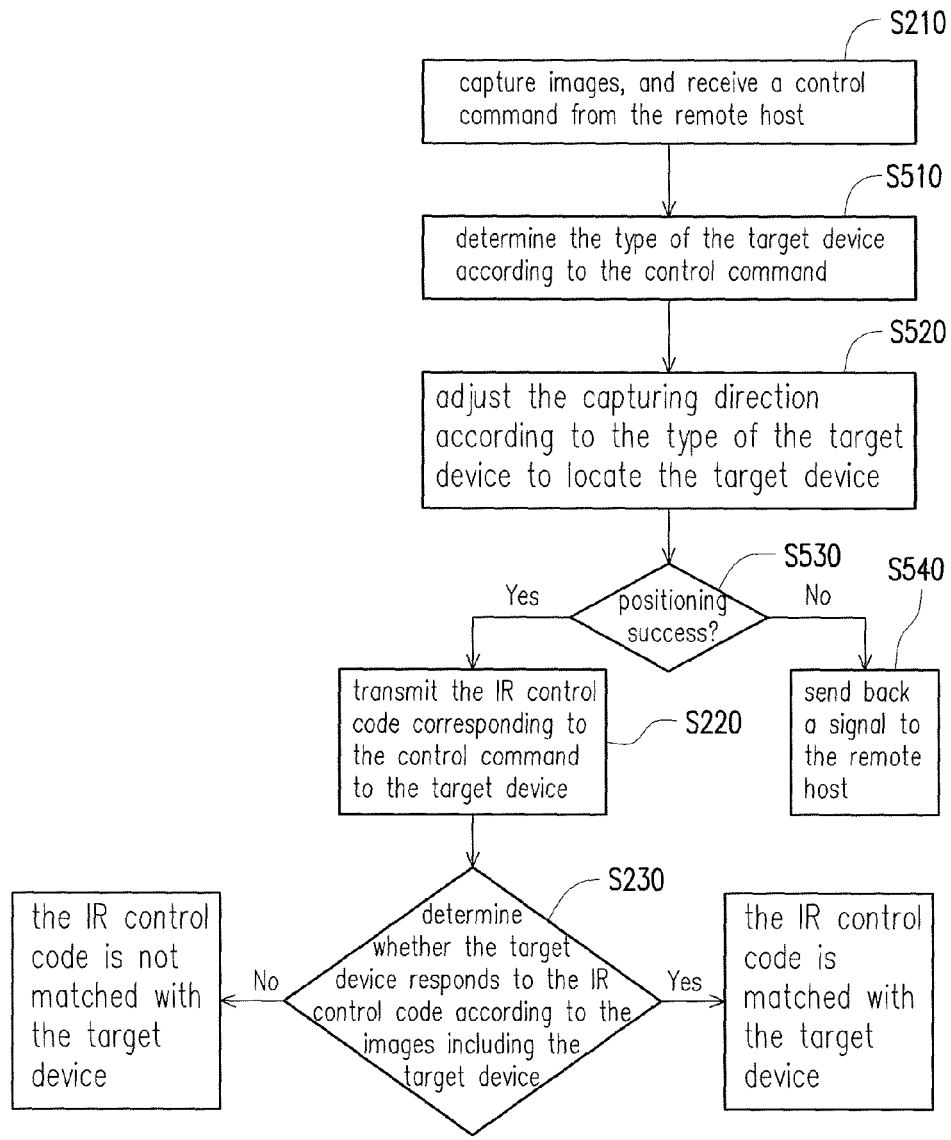
FIG. 5 is a flow chart showing an operation method of a web camera in an embodiment.

FIG. 5 is a flow chart showing an operation method of the web camera in an embodiment. The steps S210, S220 and S230 in FIG. 5 can be referred to those shown in FIG. 2. Please refer to FIG. 4 and FIG. 5, Step S510 is to determine the type of the target device according to the control command from the remote host. In an embodiment, the processing unit 420 can determine the type of the target device according to the control command from the remote host. Step S520 is to adjust the capturing direction of the photographic unit 440 according to the type of the target device to locate the target device. In an embodiment, the processing unit 420 controls the direction driving module 450 to adjust the capturing direction of the photographic unit 440 according to the type of the target device, so as to locate the target device. After the locating, the capturing direction of the photographic unit 440 and the light emitting direction of the IR transmitter 430 point to the target device.

In an embodiment, the processing unit 420 determines that the target device is a television according to the control command (the IR control code) from the remote host. then, the processing unit 420 controls the direction driving module 450 to adjust the panning direction, the tilt direction and the zoom ratio of the photographic unit 440, so as to search objects having features (such as the shape) of a television around the web camera 400, and locate the television (the target device). After the locating, the capturing direction of the photographic unit 440 and the light emitting direction of the IR transmitter 430 point to the television (the target device).

After the target device is located in the step S530, the processing unit 420 executes the steps S220 and S230, transmits the IR control code to the target device via the IR transmitter 430, and determines whether the target device responds to the IR control code transmitted by the IR transmitter 430 according to the image captured by the photographic unit 440. When the locating of the target device in the step S530 fails, the processing unit 420 executes step S540 to send back a signal of locating failure to the remote host.

Figure 6:
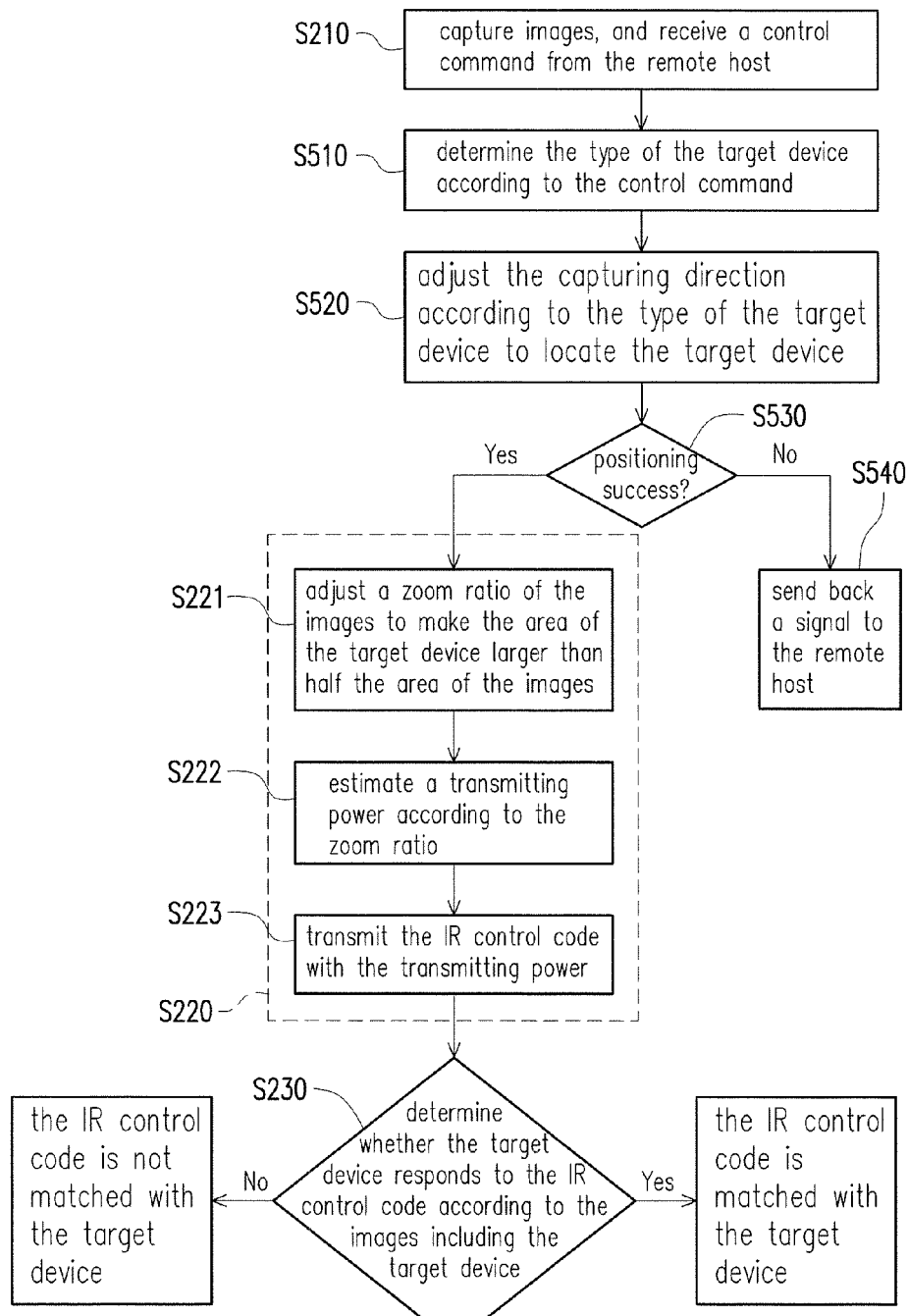
FIG. 6 is a flow chart showing an operation method of a web camera in an embodiment.

FIG. 6 is a flow chart showing an operation method of the web camera in an embodiment. The steps S210, S220, S221, S222, S223 and S230 in FIG. 6 can be referred to those shown in FIG. 3. The steps S210, S220, S230, S510, S520, S530 and S540 in FIG. 6 can be referred to those shown in FIG. 5. Please refer to FIG. 4 and FIG. 6, after the locating in the step S530, the capturing direction of the photographic unit 440 and the light emitting direction of the IR transmitter 430 point to the target device.

After the target device is located, in the step S221, the processing unit 420 adjusts the zoom ratio of the image to make the area of the target device in the image larger than half the area of the image. In the step S222, the processing unit 420 estimates a transmitting power according to the zoom ratio determined in the step S221. In the step S223, the processing unit 420 dynamically controls and adjusts the power of the IR transmitter 430, and the IR transmitter 430 transmits the IR control code to the target device with the power estimated in the step S222. In the embodiment, since the power of the IR transmitter 430 can be dynamically adjusted according the distance between the web camera 400 and the target device, the power consumption can be reduced.

In the step S230, the processing unit 420 determines whether the target device responds to the IR control code transmitted by the IR transmitter 430 according to the image captured by the photographic unit 440. If yes, the processing unit 420 determines the IR control code is matched with the target device. If no, the processing unit 420 determines the IR control code is not matched with the target device. The processing unit 420 also sends back the determining result of whether the target device responds to the IR control code to the remote host via the network communication unit 410 and the communication network in the step S230. Consequently, the remote host can remotely control and confirm the state of the target device via the web camera 400.

Figure 7:
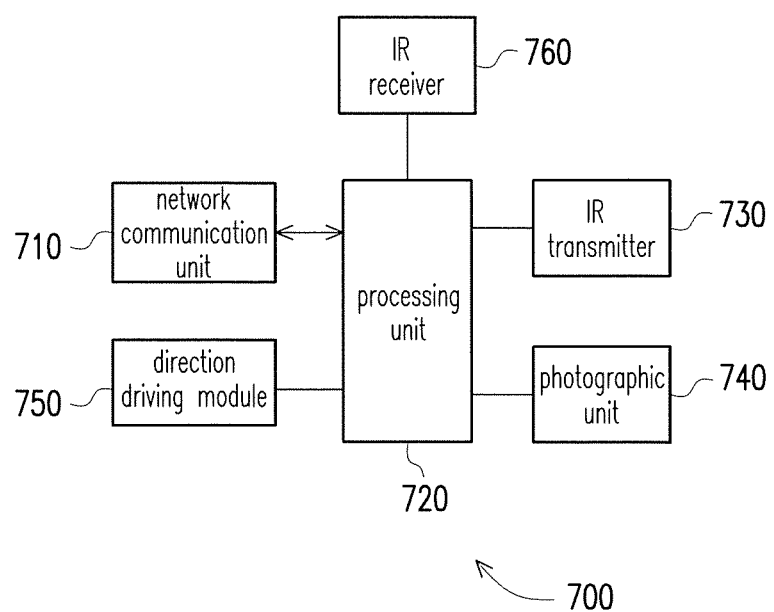
FIG. 7 is a block diagram showing a web camera in an embodiment.

FIG. 7 is a block diagram showing a web camera 700 in an embodiment. The web camera 700, the network communication unit 710, the processing unit 720, the IR transmitter 730, the photographic unit 740 and the direction driving module 750 shown in FIG. 7 can be referred to those in FIG. 4. In the embodiment shown in FIG. 7, the web camera 700 further includes an IR receiver 760 coupled to the processing unit 720. The processing unit 720 receives and studies an IR control code about the target device via the IR receiver 760.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A web camera, comprising:
    a photographic unit capturing a plurality of images;
    an infrared (IR) transmitter;
    a network communication unit connected to a remote host via a communication network; and
    a processing unit coupled to the photographic unit, the IR transmitter and the network communication unit;
    wherein the processing unit sends the image to the remote host via the network communication unit, receives a control command from the remote host, transmits an IR control code corresponding to the control command to a target device via the IR transmitter, and determines whether the target device responds to the IR control code according to the images including the target device, if the target device responds to the IR control code, the processing unit determines that the IR control code is matched with the target device.

2. The web camera according to claim 1, wherein the processing unit sends back a determining result of whether the target device responds to the IR control code to the remote host via the network communication unit.

3. The web camera according to claim 1, wherein the processing unit executes a motion detection on the image.

4. The web camera according to claim 1, wherein the web camera further includes:
    a direction driving module coupled to the processing unit and adjusting a capturing direction of the photographic unit according to a control of the processing unit.

5. The web camera according to claim 4, wherein the processing unit determines a type of the target device according to the control command from the remote host, and controls the direction driving module to adjust the capturing direction of the photographic unit according to the type of the target device.

6. An operation method of a web camera, comprising following steps:
    capturing a plurality of images by a photographic unit;
    sending the plurality of images to a remote host via a communication network;
    receiving a control command from the remote host;
    transmitting an infrared (IR) control code corresponding to the control command to a target device via an IR transmitter; and
    determining whether the target device responds to the IR control code according to the images including the target device by a processing unit, if the target device responds to the IR control code, determining that the IR control code is matched with the target device.

7. The operation method of the web camera according to claim 6, wherein the operation method further includes:
    sending back a determining result of whether the target device responds to the IR control code to the remote host via the network communication unit.

8. The operation method of the web camera according to claim 6, wherein the step of determining whether the target device responds to the IR control code includes:
    executing a motion detection on the image by the processing unit to determine whether the target device responds to the IR control code.

9. The operation method of the web camera according to claim 6, wherein the operation method further includes:
    adjusting a capturing direction of the photographic unit by a direction driving module.

10. The operation method of the web camera according to claim 9, wherein the operation method further includes:
  determining a type of the target device according to the control command sent by the remote host; and
  adjusting the capturing direction of the photographic unit by the direction driving module according to the type of the target device.

\* \* \* \* \*